June 23, 1931. F. VAN BEZEL 1,811,735
PACKING GLAND
Filed July 19, 1929
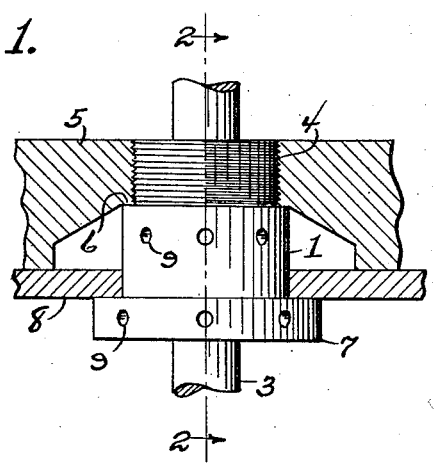
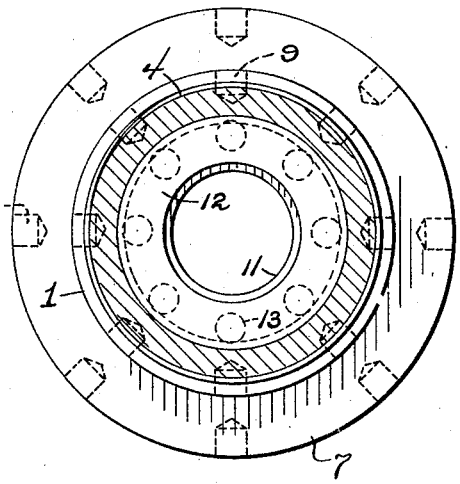
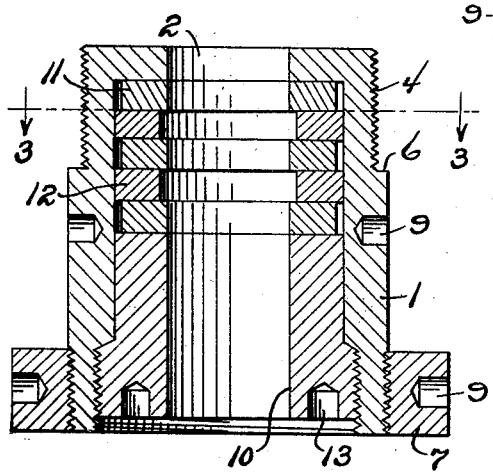
Frank Van Bezel
INVENTOR
BY Victor J. Evans
ATTORNEY Patented June 23, 1931

1,811,735

UNITED STATES PATENT OFFICE

FRANK VAN BEZEL, OF EL CENTRO, CALIFORNIA, ASSIGNOR TO DUAL AIRCRAFT MOTORS INC., LTD., OF EL CENTRO, CALIFORNIA

PACKING GLAND

Application filed July 19, 1929. Serial No. 379,465.

This invention relates to a leak-proof gland for preventing leakage around a reciprocating rod, the general object of the invention being to provide a plurality of rings, with retaining means therefor for surrounding the rod and preventing leakage past the same.

The gland is mainly designed for use in an internal combustion engine, such as that forming the subject matter of an application filed concurrently herewith.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a view, partly in section, showing the gland in use.

Figure 2 is a section on line 2—2 of Figure 1.

Figure 3 is a section on line 3—3 of Figure 2.

In these views, the numeral 1 indicates the body of the gland which has its lower end open and its top closed, with a hole 2 in said top through which the rod 3 passes. The upper part of the body is reduced in diameter and is exteriorly threaded, as at 4, so that it can be screwed into a member 5 which is the lower head of the cylinder shown in the above mentioned application. A shoulder 6 is formed at the junction of the reduced part with the other part and this shoulder receives a gasket which forms a tight connection between the part 5 and the body 1. A nut 7 is threaded on the lower end of the body and bears against the member 8 which is the top of the crank case of the engine shown in the above mentioned application. This nut 7 seals the opening formed in the member 8, so that oil cannot pass from the crank case through said opening. Both the body 1 and the nut 7 are formed with the holes 9 so that the parts can be screwed in place or removed by a spanner wrench.

The inner lower part of the body 1 is threaded to receive the lower threaded part of a bushing 10 which acts to hold the rings 11 and 12 in the upper part of the body. The rings 12 are plain flat rings and act as spacers for the rings 11 which are of the split contracting type and made of heat resisting material. These rings 11 snugly fit the rod 3 and prevent leakage of oil past the same. The lower end of the bushing 10 is also provided with the wrench receiving holes 13 and these holes can be used to receive a spring lock.

Thus I have provided a simple form of gland which eliminates the use of packing material as it uses the rings instead.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a member having a threaded hole therein and a flat shoulder surrounding the lower end of the hole and a second member having a hole therein of greater diameter than the threaded hole, a gland having its body provided with a reduced upper part exteriorly threaded to fit in the threaded hole, the shoulder formed at the junction of the reduced part with the other part of the body engaging the shoulder on the first member and the lower part of the body passing through the hole in the second member, a nut threaded on the lower end of the body and bearing against the second member, packing rings in the body and a removable retainer threaded in the lower part of the body for holding the packing rings in place.

In testimony whereof I affix my signature.

FRANK VAN BEZEL.